(12) United States Patent
Jung et al.

(10) Patent No.: US 10,051,680 B2
(45) Date of Patent: *Aug. 14, 2018

(54) METHOD AND APPARATUS FOR CONNECTING SHORT-RANGE WIRELESS COMMUNICATION IN TERMINAL

(71) Applicant: Samsung Electronics Co., Ltd., Suwon-si, Gyeonggi-do (KR)

(72) Inventors: Bu-Seop Jung, Suwon-si (KR); Edwin Joseph Vimal Bastin, Suwon-si (KR); Ji-Hyun Jung, Anyang-si (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/424,476

(22) Filed: Feb. 3, 2017

(65) Prior Publication Data
US 2017/0150543 A1    May 25, 2017

Related U.S. Application Data

(63) Continuation of application No. 13/973,404, filed on Aug. 22, 2013, now Pat. No. 9,591,675.

(30) Foreign Application Priority Data

Feb. 21, 2013  (KR) .................... 10-2013-0018882

(51) Int. Cl.
| | |
|---|---|
| H04B 7/00 | (2006.01) |
| H04W 76/15 | (2018.01) |
| H04W 76/02 | (2009.01) |
| H04W 48/16 | (2009.01) |
| H04W 48/20 | (2009.01) |
| H04W 84/12 | (2009.01) |
| H04W 88/06 | (2009.01) |

(52) U.S. Cl.
CPC ........... *H04W 76/15* (2018.02); *H04W 48/16* (2013.01); *H04W 48/20* (2013.01); *H04W 76/025* (2013.01); *H04W 84/12* (2013.01); *H04W 88/06* (2013.01)

(58) Field of Classification Search
CPC .... H04W 76/025; H04W 48/16; H04W 48/20
See application file for complete search history.

(56) References Cited

U.S. PATENT DOCUMENTS 7,783,284 B1    8/2010  Laux et al.
9,092,812 B2 *  7/2015  Kim .................. G06Q 30/0601
(Continued)

FOREIGN PATENT DOCUMENTS

| CN | 101371515 A | 2/2009 |
| CN | 101578900 A | 11/2009 |
| EP | 2509367 A1 | 10/2012 |

OTHER PUBLICATIONS

XP002668924, "The Future of Hotspots: Making Wi-Fi as Secure and Easy to Use as Cellular", Jun. 10, 2011.

*Primary Examiner* — Tuan Pham
(74) *Attorney, Agent, or Firm* — Jefferson IP Law, LLP

(57) ABSTRACT

A method and an apparatus for connecting short-range wireless communication in a terminal are provided. The method includes connecting with an external device through a short-range wireless communication unit, and after connecting with the external device, providing information about at least one other connectable external device.

20 Claims, 10 Drawing Sheets

(56) References Cited

U.S. PATENT DOCUMENTS

| | | |
|---|---|---|
| 2004/0002366 A1 | 1/2004 | Cromer et al. |
| 2005/0190747 A1* | 9/2005 | Sindhwani ............ H04W 88/06 370/352 |
| 2007/0167174 A1 | 7/2007 | Halcrow et al. |
| 2008/0181187 A1 | 7/2008 | Scott et al. |
| 2010/0313020 A1 | 12/2010 | Montemurro |
| 2011/0280229 A1 | 11/2011 | Montemurro et al. |
| 2011/0280230 A1 | 11/2011 | Rawlins et al. |
| 2011/0280231 A1 | 11/2011 | Montemurro et al. |
| 2012/0076118 A1 | 3/2012 | Montemurro et al. |
| 2012/0165056 A1 | 6/2012 | Kim et al. |
| 2012/0176648 A1 | 7/2012 | Nakamura |
| 2012/0233688 A1 | 9/2012 | Tonouchi et al. |
| 2013/0223340 A1* | 8/2013 | Jeong .................... H04W 48/16 370/328 |
| 2014/0185598 A1* | 7/2014 | Canpolat ............... H04W 48/16 370/338 |

* cited by examiner

METHOD AND APPARATUS FOR CONNECTING SHORT-RANGE WIRELESS COMMUNICATION IN TERMINAL

PRIORITY

This application is a continuation application of prior application Ser. No. 13/973,404, filed on Aug. 22, 2013 which claims the benefit under 35 U.S.C. § 119(a) of a Korean patent application filed on Feb. 21, 2013 in the Korean Intellectual Property Office and assigned Serial No. 10-2013-0018882, the entire disclosure of which is hereby incorporated by reference.

BACKGROUND OF THE INVENTION

1. Field of the Invention

The present invention relates to a method and apparatus for connecting short-range wireless communication in a terminal. More particularly, the present invention relates to a short-range wireless communication connection method and apparatus, by which a terminal can provide information about other connectable external devices selectable by the user, after it is connected to a specific external device by short-range wireless communication.

2. Description of the Related Art

Wi-Fi Hotspot network access technology, a short-range wireless access technology, will soon be commercialized. A typical example of this technology is Hotspot 2.0, in which a terminal capable of Wi-Fi communication can more easily access a public Wi-Fi network without the separate user's input.

FIG. 1 illustrates a configuration of a Wi-Fi Hotspot network system, and more particularly, illustrates a system configuration for new Wi-Fi Hotspot network access according to the related art.

This system uses a separate network discovery method in which a terminal 10 can acquire external network information, and also has a separate information server 20 that manages and stores the external network information.

For example, a Hotspot 2.0 system, a typical example of the above system, has an Access Network Query Protocol (ANQP) for network discovery, and also has an ANQP server for the information server.

Conventionally, in order to access an Access Point (AP) in a Wi-Fi Hotspot network, a user must check a list of APs using a Scan list, and determine whether a certain AP is an accessible or connectable AP, using the list of APs; in order to access a desired AP, the user must perform a connection settings task. The related art connection settings task performed to select an AP using the Scan list and to access the selected AP includes dropping the usability or ease of use for users who are unfamiliar with the Wi-Fi features. To overcome these disadvantages, Hotspot 2.0 technology aims to provide the usability to terminals such as a cellular terminal.

The Hotspot 2.0 technology is based on the Institute of Electrical and Electronics Engineers (IEEE) 802.11u standard, and provides enhanced security by using Wi-Fi Protected Access II (WPA2)-Enterprise security. In addition, Hotspot 2.0 technology provides a variety of other functions, such as providing a Data Off-loading function of the cellular network.

In the Hotspot 2.0 system, a terminal supports enhanced network discovery using the 802.11u-based ANQP. The enhanced network discovery operation using ANQP is advantageous in that, before its access to an AP, the terminal can check a variety of following information, in addition to the information that is acquired in the conventional scan process. Although the following information is provided in the current standard, the information can be further extended as a variety of use cases are developed.

$3^{rd}$ Generation Partnership Project (3GPP) Cellular Network Information
Network Access Identifier (NAI) Realm List
Roaming Consortium List
Domain Name list
Venue Name Information
Operator Friendly Name
Internet Protocol (IP) Address Type Availability information
Wide Area Network (WAN) Metrics
Connection Capability
Operating Class Indication
Network Authentication Type information A Homogeneous Extended Service Set Identifier (HESSID) uses one Media Access Control (MAC) address among Base Station Subsystem Identifiers (BSSIDs) of APs of a public network formed by a Hotspot service provider, and the HESSID is a globally unique value. A terminal may identify a service provider using the HESSID. In other words, the service provider has a single unique HESSID value. The HESSID is included in an interworking element of a beacon or a probe response sent by an AP.

In the Wi-Fi Hotspot network system illustrated in FIG. 1, each AP constituting a Base Station Subsystem (BSS) may provide BSS link information to the terminal. For example, the terminal 10 may check beacon or probe response information by a scan operation, and BSS link information is contained in the beacon or probe response. As the BSS link information includes information such as a network load of BSS, channel utilization, and the number of connected terminals, the terminal may determine the current utilization and load of the BSS based on the information.

In the Wi-Fi Hotspot network system, the terminal 10 may acquire link information of the external network from the information server 20 by performing network discovery. Based on the link information, the terminal 10 may acquire information (down link speed & load, uplink speed & load, and the like) about the external network connected to the AP.

In addition, the terminal 10 may perform automatic connection without user involvement by acquiring, from the information server 20, information about a provider providing the Wi-Fi network, and connection information including a connection method for connecting with the Wi-Fi network.

FIG. 2 illustrates multiple Wi-Fi Hotspot network systems coexisting in the same area according to the related art.

Referring to FIG. 2, multiple new Wi-Fi Network systems (or Hotspot 2.0 systems) A and B, each having an information server outside its network, may coexist in the same area.

In this case, an AP capable of automatically connecting with the terminal 10 and an AP incapable of automatically connecting with the terminal 10 may coexist in the same area.

In the new Wi-Fi network system in which the terminal acquires network information from the information server connected to the AP and automatically connects with the AP, there is no specific provision that indicates with which Wi-Fi network and AP the terminal should connect if the above situation occurs.

Hotspot 2.0, a typical example of the above system, provides that the terminal 10 has different priorities for pre-configured networks. Further, the standard provides an option of allowing the user to adjust the priorities of the pre-configured networks.

In accordance with the specifications of the new system, the terminal 10 may be pre-specified so that the Wi-Fi network provided by a specific provider may have priority for the terminal 10. As to the way to give priority to a specific provider, the specific provider selected by the user may have priority, or the specific provider may be determined by a policy specified by the network operator.

Alternatively, the terminal 10 may select a network by calculating the highest quality at the connection time, and then automatically connect with the selected network. Therefore, in the situation of FIG. 2, the terminal is automatically connected to the Wi-Fi network A having the higher priority.

All of the above methods share the characteristic that the terminal is automatically connected based on the pre-specified priority or by the algorithm pre-defined in the terminal, without user intervention.

These ways to automatically connect with the network without user intervention may significantly contribute to an increase in the usability of the Wi-Fi features.

However, these automatic connection methods have disadvantages. For example, compared to the network to which the terminal is connected based on the priority, adjacent networks may have higher quality, and in certain areas, the user may want to use a network other than the network to which the terminal is connected based on the pre-specified priority. Even though the terminal may have connected to the best available network at the time of the first connection, the best network may be subject to change over time due to the user's movements or external factors. Sometimes, the user may want to use free networks rather than pay networks to which the terminal would be connected based on the priority.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a short-range wireless communication connection method and apparatus, by which a terminal can automatically provide information about other connectable external devices, after the terminal is connected to a specific external device by short-range wireless communication.

In accordance with another aspect of the present invention, a short-range wireless communication connection method and apparatus are provided. The terminal can provide information about other connectable external devices at a request of a user, after the terminal is connected to a specific external device by short-range wireless communication.

In accordance with yet another aspect of the present invention, a short-range wireless communication connection method and apparatus are provided. The terminal can automatically connect with a preset external device by short-range wireless communication according to information about a location of the terminal.

In accordance with still another aspect of the present invention, a method for connecting short-range wireless communication in a terminal is provided. The method includes connecting with an external device through a short-range wireless communication unit, and after connecting with the external device, providing information about at least one other connectable external device.

In accordance with yet still another aspect of the present invention, a method for connecting short-range wireless communication in a terminal is provided. The method includes, upon request for connecting short-range wireless communication, connecting with an external device meeting predetermined conditions among a plurality of external devices discovered by a scan operation, after connecting with the external device, informing of presence of other connectable external devices, if a 'View Other Connectable External Devices' option is selected, detecting external devices having connection information matching with connection information stored in the terminal, among a plurality of external devices discovered by a scan operation, and providing a network list that shows information about the detected external devices and connection status information for each of the detected external devices.

In accordance with even still another aspect of the present invention, an apparatus for connecting short-range wireless communication in a terminal is provided. The apparatus includes a short-range wireless communication unit, and a controller configured to provide information about at least one other connectable external device, after the apparatus is connected to an external device through the short-range wireless communication unit.

In accordance with even yet another aspect of the present invention, an apparatus for connecting short-range wireless communication in a terminal is provided. The apparatus includes a short-range wireless communication unit, and a controller configured to, upon request for connecting short-range wireless communication, connect with an external device meeting predetermined conditions among a plurality of external devices discovered by a scan operation, after connecting with the external device, to inform the presence of other connectable external devices, if a 'View Other Connectable External Devices' option is selected, to detect external devices having connection information matching with connection information stored in the terminal, among a plurality of external devices discovered by a scan operation, and to provide a network list including information about the detected external devices and connection status information for each of the detected external devices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
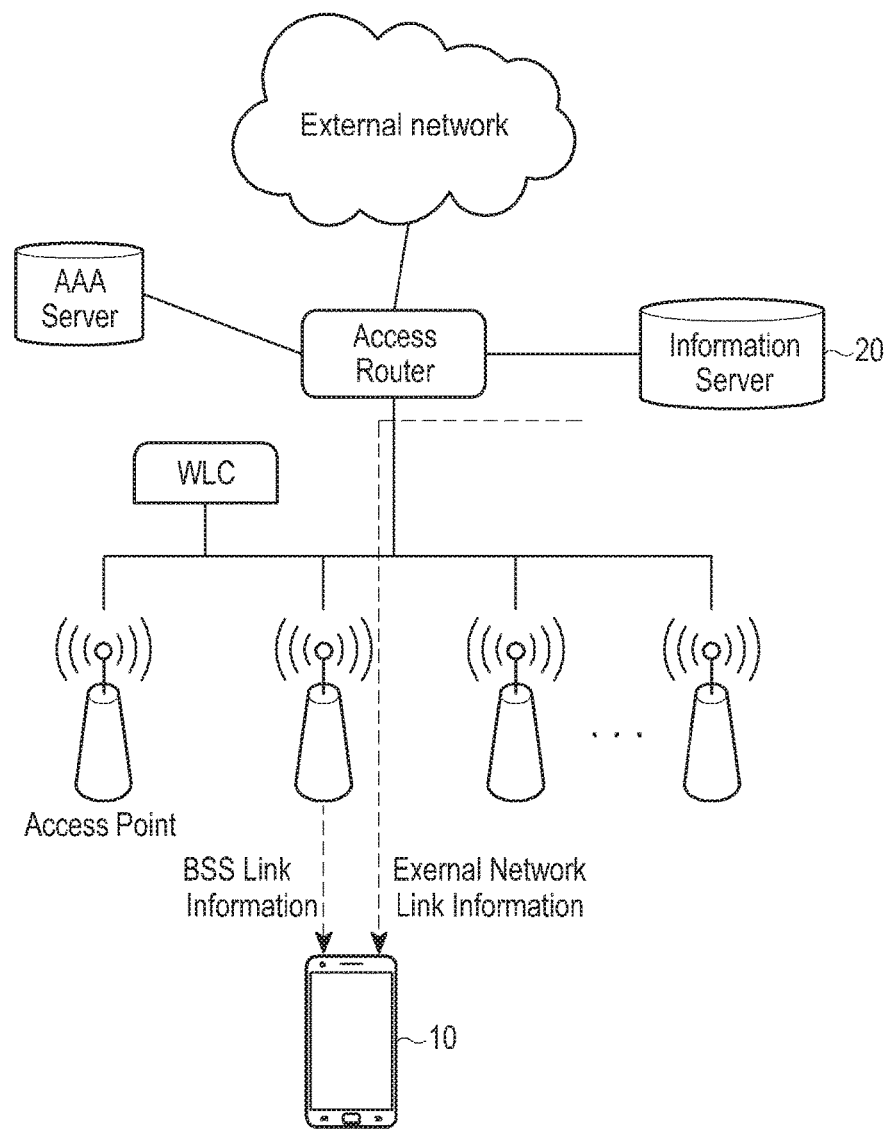
FIG. 1 illustrates a configuration of a Wi-Fi Hotspot network system according to the related art.
Figure 2:
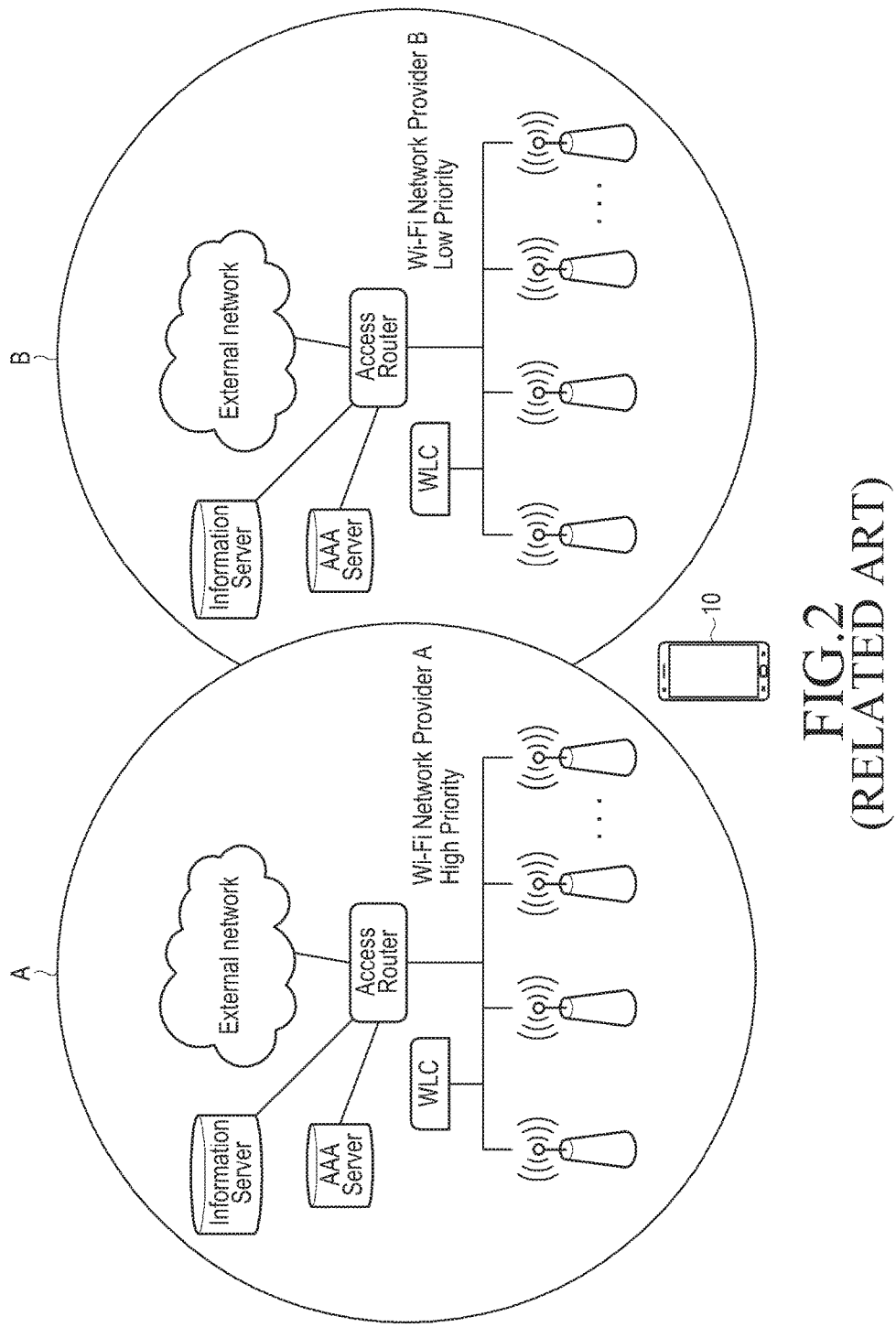
FIG. 2 illustrates multiple Wi-Fi Hotspot network systems coexisting in the same area according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terminal, to which exemplary embodiments of the present invention are applicable, may include a mobile terminal and a fixed terminal. The mobile terminal, an easy-to-carry mobile electronic device, may include a video phone, a cellular phone, a smart phone, an International Mobile Telecommunication 2000 (IMT-2000) terminal, a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-book reader, a portable computer (for example, a laptop computer, a tablet computer and the like), a digital camera or the like. The fixed terminal may include a desktop Personal Computer (PC) and the like.

In exemplary embodiments of the present invention, the short-range wireless communication includes a Wi-Fi communication network capable of supporting Hotspot 2.0 in which the network is automatically switched from the mobile communication network to the Wi-Fi communication network. The external device, to which a terminal is connected to over the Wi-Fi communication network, is an Access Pont (AP), and includes at least one of an AP supporting Hotspot 2.0 (or Hotspot 2.0-supported AP), which is connected to an information server, and an AP not supporting Hotspot 2.0 (or Hotspot 2.0-unsupported AP), which is not connected to the information server. The Hotspot 2.0-unsupported AP unconnected to the information server is a general AP, which is connected to the terminal only if it is selected by the user, or which is automatically connected to the terminal according to connection information stored in the terminal in advance.

Therefore, in exemplary embodiments of the present invention, the external device will be referred to as an AP, the Hotspot 2.0-supported AP connected to the information server will be referred to as a first AP, and the Hotspot 2.0-unsupported AP unconnected to the information server will be referred to as a second AP.

Figure 3:
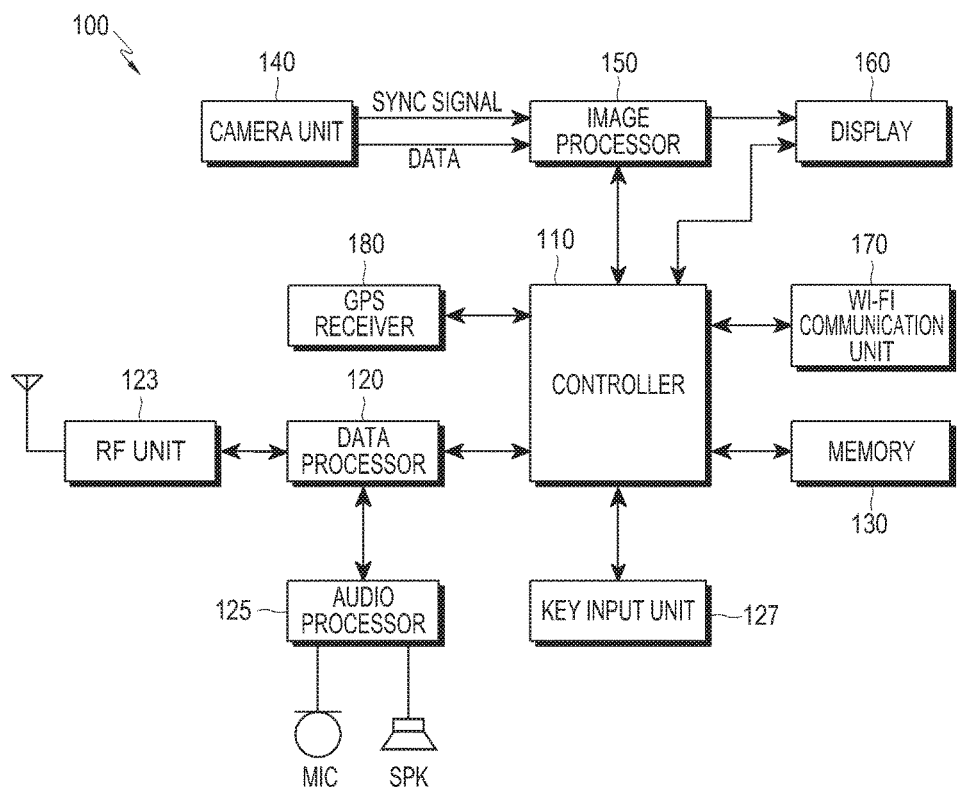
FIG. 3 illustrates a structure of a terminal according to an exemplary embodiment of the present invention.

FIG. 3 illustrates a structure of a terminal according to an exemplary embodiment of the present invention.

Referring to FIG. 3, a Radio Frequency (RF) unit 123 is responsible for wireless communication of the terminal 100. The RF unit 123 may include an RF transmitter for up-converting a frequency of transmission signals and amplifying the up-converted signals, and an RF receiver for low-noise-amplifying (LNA) received signals and down-converting a frequency of the LNA-amplified signals. A data processor 120 may include a transmitter for coding and modulating the transmission signals and a receiver for demodulating and decoding the received signals. In other words, the data processor 120 may comprise a modulator/demodulator (modem) and a coder/decoder (codec). The codec may include a data codec for processing packet data and the like, and an audio codec for processing audio signals such as voice. An audio processor 125 plays received audio signals output from the audio codec in the data processor 120, using a speaker SPK, and transfers audio transmission signals picked up by a microphone MIC to the audio codec in the data processor 120.

A key input unit 127 includes character/numeric keys for entering character/numeric information, and function keys for setting a variety of functions. The keys may be physical hard keys or virtual soft keys such as may be provided by a touch interface.

A memory 130 may be divided into a program memory and a data memory. The program memory may store control programs for controlling the general operation of the terminal. In accordance with exemplary embodiments of the present invention, the program memory may store control programs for controlling to provide information about at least one other connectable AP, if the terminal is connected to a specific AP meeting the predetermined conditions upon request for connecting short-range wireless communication. The data memory may temporarily store data generated or received during execution of the control programs or other software.

In accordance with exemplary embodiments of the present invention, the memory 130 stores connection information for detecting a connectable AP among a plurality of APs discovered by a scan operation, and the connection information may include at least one of a connection method and an authentication scheme.

The memory 130 stores information about an AP which is set on a priority connection basis for the information about the location where the terminal is located A controller 110 controls the overall operation of the terminal.

In accordance with exemplary embodiments of the present invention, upon request for Wi-Fi connection, the controller 110 discovers a plurality of APs by a scan operation, and sorts out first APs which are Hotspot 2.0-supported AP, among the plurality of APs. The controller 110 connects with a specific first AP meeting predetermined conditions (for example, the predetermined priority, or the network quality at the point of connection) among the sorted first APs.

After the terminal is connected to the specific first AP, the controller 110 detects at least one other connectable first AP and provides information about the detected first AP.

In accordance with a first exemplary embodiment of the present invention, if a 'View Other Connectable First APs' option is selected after the terminal is connected to the specific first AP, the controller 110 detects, as connectable first APs, the first APs having connection information matching with connection information stored in the memory 130, among the plurality of first APs discovered by a scan operation, and provides a network list showing information about the detected first APs and connection status information for each of the detected first APs. The connection status information may be shown or displayed in at least one of a Received Signal Strength Indication (RSSI), a data rate, a billing status (for example, a pay network or a free network), and a network provider type (for example, a home provider or a roaming partner).

If the 'View Other Connectable First APs' option is selected after the terminal is connected to the specific first AP, the controller 110 discovers a plurality of first APs by a scan operation, and receives network information for each of the plurality of first APs through an Access Network Query Protocol (ANQP) procedure with the information server connected to each of the plurality of discovered first APs. The controller 110 determines whether connection information included in the network information matches with the connection information stored in the memory 130, and detects the network information having the connection information matching with the connection information stored in the memory 130. The controller 110 detects a first AP corresponding to the detected network information as the connectable first AP. The connection information may include at least one of a connection method and an authentication scheme.

In accordance with a second exemplary embodiment of the present invention, after the terminal is connected to the specific first AP, the controller 110 checks a connection status value of the connected specific first AP. If the connection status value of the connected specific first AP is less than or equal to a threshold, the controller 110 detects, as connectable first APs, first APs having connection information matching with the connection information stored in the memory 130, among the plurality of first APs discovered by a scan operation. The controller 110 provides a network list showing information about the detected first APs and connection status information for each of the detected first APs. The connection status information may be shown or displayed in at least one of an RSSI, a data rate, a billing status (for example, a pay network or a free network), and a network provider type (for example, a home provider or a roaming partner).

If the connection status value of the specific first AP is less than or equal to a threshold after the terminal is connected to the specific first AP, the controller 110 discovers a plurality of first APs by a scan operation. The controller 110 receives network information for each of the plurality of first APs through an ANQP procedure with the information server connected to each of the plurality of discovered first APs. The controller 110 determines whether connection information included in the network information matches with connection information stored in the memory 130, detects the network information having connection information matching with the connection information stored in the memory 130, and detects a first AP corresponding to the detected network information as the connectable first AP. The connection information may include at least one of a connection method and an authentication scheme.

In accordance with a third exemplary embodiment of the present invention, if a 'View Other Connectable External Devices' option is selected after the terminal is connected to the specific first AP, the controller 110 discovers a plurality of APs by a scan operation, and sorts the plurality of plurality of discovered APs according to their type. The controller 110 sorts the plurality of discovered APs into first APs representing Hotspot 2.0-supported APs and second APs representing Hotspot 2.0-unsupported APs.

The controller 110 may sort the plurality of APs into first APs representing Hotspot 2.0-supported APs and second APs representing Hotspot 2.0-unsupported APs, based on the information included in a beacon or probe response received from each of the plurality of discovered APs.

The controller 110 receives network information for each of the sorted first APs through an ANQP procedure with the information server connected to each of the sorted first APs, and determines whether connection information included in the network information matches with the connection information stored in the memory 130. The controller 110 detects, as connectable first APs, the first APs corresponding to the network information having connection information matching with the connection information stored in the memory 130. The connection information may include at least one of a connection method and an authentication scheme.

The controller 110 detects, as connectable second APs, second APs whose previous connection information is stored in the memory 130, among the sorted second APs.

The controller 110 provides a network list that shows the first and second APs detected as connectable APs, and connection status information for each of the detected first and second APs. The controller 110 may display the first and second APs shown in the network list in different ways. The connection status information may include at least one of an RSSI, a data rate, a billing status, and a network provider type.

In accordance with a fourth exemplary embodiment of the present invention, the controller 110 discovers a plurality of first APs by a scan operation, upon request for connecting Wi-Fi communication. The controller 110 detects and connects with a specific first AP which is set in advance on a priority connection basis for the location information of the terminal, among the plurality of discovered first APs. In accordance with an exemplary embodiment of the present invention, the controller 110 may detect location information of the terminal through a Global Positioning System (GPS) receiver 180. However, the controller 110 may detect the location information of the terminal not only through the GPS receiver 180, but also by applying a variety of known methods.

If the location information of the terminal is changed, the controller 110 discovers a plurality of first APs by a scan operation, and detects and connects with a specific first AP which is set in advance on a priority connection basis for the changed location information of the terminal, among the plurality of discovered first APs.

If short-range wireless communication is performed for a predetermined time or more after the terminal is connected a specific first AP by short-range wireless communication, the controller 110 sets the specific first AP on a priority connection basis for the current location information of the terminal.

A camera unit 140 includes a camera sensor for capturing image or video data and converting the captured optical image signals into electrical image signals, and a signal processor for converting the analog image signals captured by the camera sensor into digital image data. The camera sensor may be a Charge-Coupled Device (CCD) or Complementary Metal-Oxide Semiconductor (CMOS) sensor, and the signal processor may be implemented with a Digital Signal Processor (DSP). The camera sensor and the signal processor may be implemented either integrally or separately.

An image processor 150 performs Image Signal Processing (ISP) to display the image signals output from the camera unit 140, on a display 160. The ISP may include gamma correction, interpolation, spatial variation, image effects, image scaling, Auto White Balance (AWB), Auto Exposure (AE), Auto Focus (AF), and the like. The image processor 150 processes image signals output from the camera unit 140 on a frame basis, and outputs frame image data according to the characteristics and size of the display 160. The image processor 150, which includes a video codec, compresses frame image data displayed on the display 160 and decompresses the compressed frame image data into its original frame image data, using a predetermined coding/decoding scheme. The video codec may be a Joint Photographic Experts Group (JPEG) codec, a Moving Picture Experts Group 4 (MPEG4) codec, a Wavelet codec, and the like. The image processor 150 may have an On Screen Display (OSD) function. Under control of the controller 110, the image processor 150 may output OSD data depending on the size of the displayed screen.

The display 160 displays, on its screen, the image signals output from the image processor 150 and the user data output from the controller 110. A Liquid Crystal Display (LCD) may be used as the display 160. In this case, the display 160 may include an LCD controller, a video memory capable of storing image data, and an LCD panel. When implemented as a touch screen, the LCD may operate as an input unit. In this case, the same keys as those on the key input unit 127 may be displayed on the display 160.

If the display 160 is used as a touch screen unit as it is implemented in a touch screen fashion, the touch screen unit is comprised of a Touch Screen Panel (TSP) including a plurality of sensor panels, and the sensor panels may include a capacitive sensor panel capable of detecting touches by a fingertip and an electromagnetic induction sensor panel capable of detecting fine touches by a touch pen such as a stylus pen.

In accordance with an exemplary embodiment of the present invention, after the terminal is connected to a specific first AP upon request for Wi-Fi connection, the display 160 may display a network list that includes information about other connectable first APs and connection status information for each of the connectable APs.

A Wi-Fi communication unit 170 is a short-range wireless communication unit, and can be connected to a first AP which is a Hotspot 2.0-supported AP, and a second AP which is a Hotspot 2.0-unsupported AP.

The GPS receiver 180 can detect the current location information of the terminal.

A short-range wireless communication connection operation in the above-described terminal will be described in detail with reference to FIGS. 4 to 8.

Figure 4:
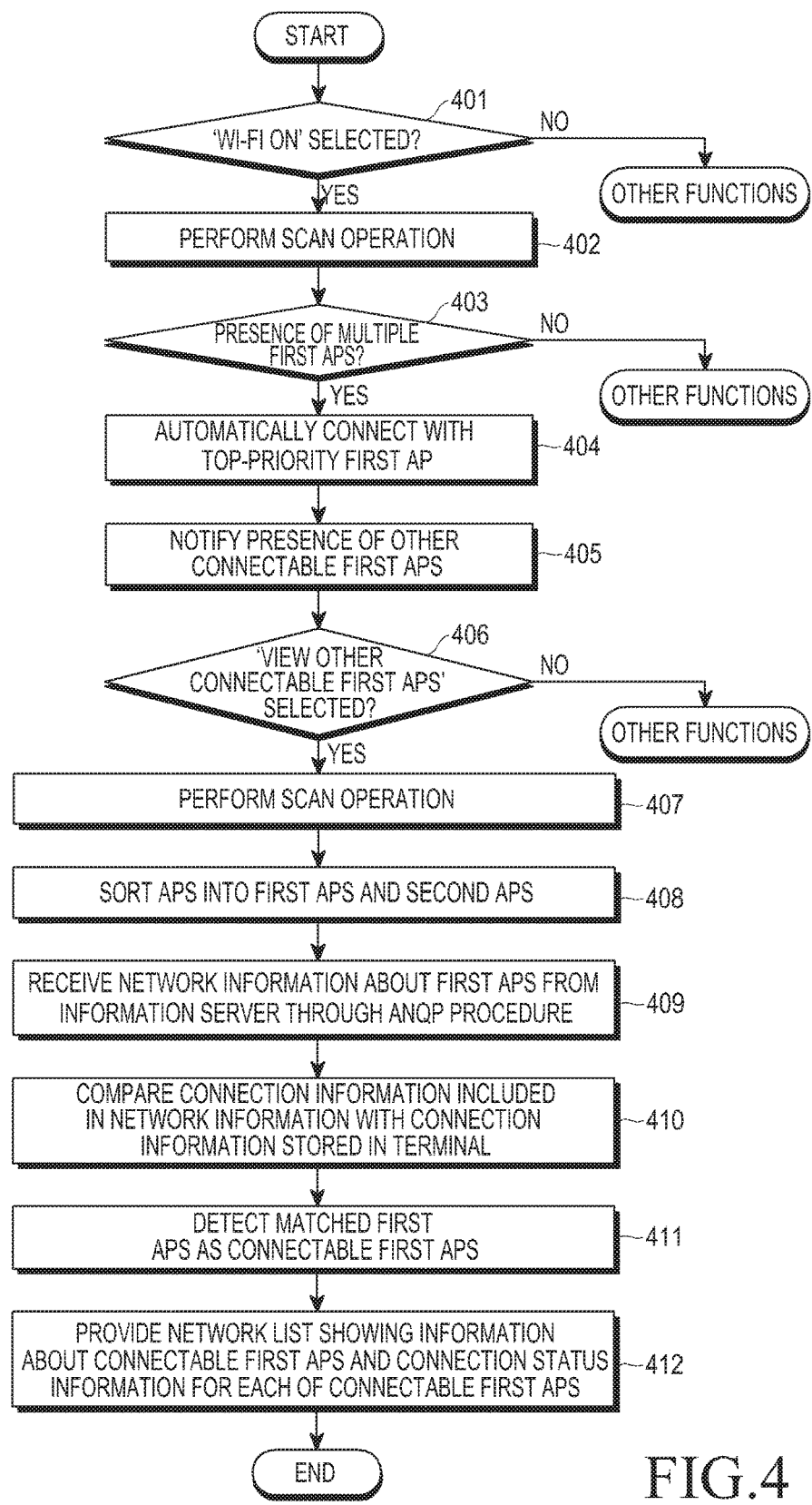
FIG. 4 illustrates a process of connecting short-range wireless communication in a terminal according to a first exemplary embodiment of the present invention.

FIG. 4 illustrates a process of connecting short-range wireless communication in a terminal according to a first exemplary embodiment of the present invention.

The first exemplary embodiment of the present invention will be described in detail with reference to FIGS. 3 and 4.

Referring to FIG. 4, if a 'Wi-Fi On' option is selected on the terminal in operation 401, the controller 110 performs a scan operation to discover nearby APs in operation 402.

If a plurality of APs are discovered by the scan operation, the controller 110 may determine whether each of the APs is a first AP which is a Hotspot 2.0-supported AP, or a second AP which is a Hotspot 2.0-unsupported AP, based on information included in a beacon or probe response received from each of the plurality of discovered APs.

The beacon or probe response includes information about a service provider providing the APs, and Base Station Subsystem (BSS) link information (for example, network load, channel utilization, a number of connected terminals, and the like).

In the case of a first AP among the plurality of APs, the controller 110 may perform an ANQP procedure of sending a query message to an information server connected to the first AP, and receiving network information for the first AP from the information server in response to the query message.

The network information received through the ANQP procedure may include the information (for example, operator information, a connection scheme, a credential type used for connection, an authentication scheme, and the like) that the terminal uses to connect with the first AP, and data speed information of the network.

If there is a plurality of first APs among the plurality of discovered APs in operation 403, the controller 110 connects with a specific first AP (for example, a top-priority first AP) meeting predetermined conditions among the plurality of first APs, in operation 404.

In operation 405, the controller 110 informs the user of the presence of other connectable first APs except for the specific first AP to which the terminal is connected in operation 404, among the plurality of first APs which are discovered by the scan operation in operation 402. Informing the user of the presence of other connectable first APs may be automatically displayed, or may be displayed if a specific menu option (for example, 'Display Wi-Fi Connection Status Information') is selected by the user.

If a 'View Other Connectable First APs' option is selected by the user in operation 406, the controller 110 performs the scan operation again in operation 407. The scan operation in operation 407 is performed taking into account the movement of the terminal and/or the change in the network environment.

The scan operation in operation 407 is performed in the same way as the scan operation in operation 402. In operation 408, the controller 110 sorts a plurality of APs, which are discovered by the scan operation in operation 407, into first APs and second APs.

Although it is assumed in the first exemplary embodiment of the present invention that the controller 110 performs the scan operation again in operation 407 if the 'View Other Connectable First APs' option is selected by the user, the controller 110 may optionally perform operation 408 where it can sort the plurality of APs which have been discovered in operation 402 by the initial scan operation into the first APs and the second APs, without the re-scan operation of operation 407, if the 'View Other Connectable First APs' option is selected by the user.

In operation 409, the controller 110 performs an ANQP procedure of sending a query message to the information server connected to each of the plurality of sorted first APs, and receiving network information for each of the first APs from the information server connected to each of the plurality of first APs in response to the query message.

The controller 110 may optionally omit the ANQP procedure of operation 409, for the first AP having the network information which was received at and stored in the terminal through the previous ANQP procedure, among the plurality of first APs which were sorted in operation 408.

In operation 410, the controller 110 compares connection information included in the network information received through the ANQP procedure with the connection information stored in advance in the memory 130. The connection information may include at least one of a connection method and an authentication scheme.

In operation 411, the controller 110 detects network information having connection information matching with the connection information stored in the memory 130, through the comparison process, and detects the first APs corresponding to the detected network information as other connectable first APs.

In operation 412, the controller 110 provides a network list that shows information about the detected other connectable first APs and connection status information for each of the other connectable first APs.

If the user selects his/her desired first AP from the network list provided in operation 412, the controller 110 performs connection to the selected first AP.

The connection status information shown in the network list may be displayed in at least one of an RSSI, a data rate, a billing status (for example, a pay network or a free network), and a network provider type (for example, a home provider or a roaming partner). The information about other connectable first APs, which is shown in the network list, may be displayed in the order of priority depending on the connection status information. For example, if the connection status information is shown in an RSSI, the information about other connectable first APs may be displayed in the order of a high-RSSI AP.

Although it is assumed in the first exemplary embodiment of the present invention that a plurality of first APs are discovered, the controller 110 may perform connection to one first AP regardless of the predetermined conditions (for example, priority), if only one first AP is discovered in operation 403.

If there is only one other connectable first AP, one other connectable first AP is shown in the network list, and if there is no other connectable first AP, the controller 110 may inform the user of the absence of other connectable first APs.

Figure 5:
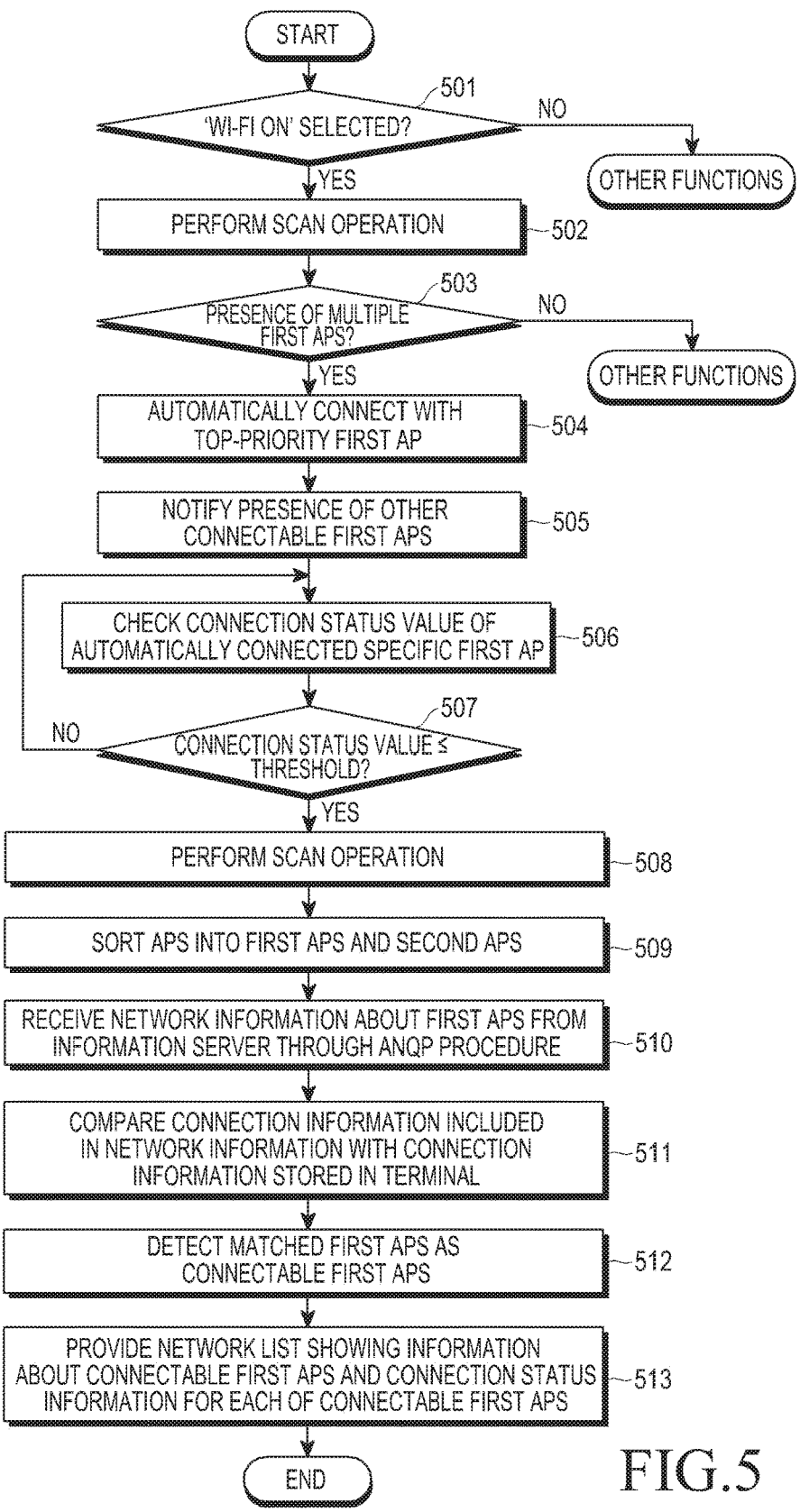
FIG. 5 illustrates a process of connecting short-range wireless communication in a terminal according to a second exemplary embodiment of the present invention.

FIG. 5 illustrates a process of connecting short-range wireless communication in a terminal according to a second exemplary embodiment of the present invention.

The second exemplary embodiment of the present invention will be described in detail with reference to FIGS. 3 and 5.

Referring to FIG. 5, if a 'Wi-Fi On' option is selected on the terminal in operation 501, the controller 110 performs a scan operation to discover nearby APs in operation 502.

If a plurality of APs are discovered by the scan operation, the controller 110 may determine whether each of the APs is a first AP which is a Hotspot 2.0-supported AP, or a second AP which is a Hotspot 2.0-unsupported AP, based on the information included in a beacon or probe response received from each of the plurality of discovered APs.

The beacon or probe response includes information about a service provider providing the APs, and BSS link information (for example, network load, channel utilization, the number of connected terminals, and the like).

In the case of a first AP among the plurality of APs, the controller 110 may perform an ANQP procedure of sending a query message to an information server connected to the first AP, and receiving network information for the first AP from the information server in response to the query message.

The network information received through the ANQP procedure may include information (for example, operator information, a connection scheme, a credential type used for connection, an authentication scheme, and the like) that the terminal uses to connect with the first AP, and data speed information of the network.

If there is a plurality of first APs among the plurality of discovered APs in operation 503, the controller 110 automatically connects with a specific first AP (for example, a top-priority first AP) meeting predetermined conditions among the plurality of first APs, in operation 504.

In operation 505, the controller 110 informs the user of the presence of other connectable first APs except for the specific first AP to which the terminal is connected in operation 504, among the plurality of first APs which are discovered by the scan operation in operation 502. Informing the user of the presence of other connectable first APs may be automatically displayed, or may be displayed if a specific menu option (for example, 'Display Wi-Fi Connection Status Information') is selected by the user.

In operation 506, the controller 110 checks a connection status value of the specific first AP, to which the terminal is connected. The connection status value may include at least one of an RSSI and a data rate.

If a connection status value of the specific first AP is less than or equal to a threshold in operation 507, the controller 110 performs a scan operation again in operation 508. The scan operation in operation 508 is performed taking into account the movement of the terminal and/or the change in the network environment.

The scan operation in operation 508 is performed in the same way as the scan operation in operation 502. In operation 509, the controller 110 sorts a plurality of APs, which are discovered by the scan operation in operation 508, into first APs and second APs.

Although it is assumed in the second exemplary embodiment of the present invention that the controller 110 performs the scan operation again in operation 508 if the connection status value of the specific first AP is less than or equal to a threshold, the controller 110 may optionally perform operation 509 where it can sort the plurality of APs which have been discovered in operation 502 by the initial scan operation into the first APs and the second APs, without the re-scan operation of operation 508, if the connection status value of the specific first AP is less than or equal to the threshold.

In operation 510, the controller 110 performs an ANQP procedure of sending a query message to the information server connected to each of the plurality of sorted first APs, and receiving network information for each of the first APs from the information server connected to each of the plurality of first APs in response to the query message.

The controller 110 may optionally omit the ANQP procedure of operation 510, for the first AP having the network information which was received at and stored in the terminal through the previous ANQP procedure, among the plurality of first APs which are sorted in operation 509.

In operation 511, the controller 110 compares connection information included in the network information received through the ANQP procedure with the connection information stored in advance in the memory 130. The connection information may include at least one of a connection method and an authentication scheme.

In operation 512, the controller 110 detects network information having connection information matching with the connection information stored in the memory 130, through the comparison process, and detects the first APs corresponding to the detected network information as other connectable first APs.

In operation 513, the controller 110 provides a network list that shows information about the detected other connectable first APs and connection status information for each of the other connectable first APs.

If the user selects his/her desired first AP from the network list provided in operation 513, the controller 110 performs connection to the selected first AP.

The connection status information shown in the network list may be displayed in at least one of an RSSI, a data rate, a billing status (for example, a pay network or a free network), and a network provider type (for example, a home provider or a roaming partner). The information about other connectable first APs, which is shown in the network list, may be displayed in the order of priority depending on the connection status information. For example, if the connection status information is shown in an RSSI, the information about other connectable first APs may be displayed in the order of a high-RSSI AP.

Although it is assumed in the second exemplary embodiment of the present invention that a plurality of first APs are discovered, the controller 110 may perform connection to one first AP regardless of the predetermined conditions (for example, priority), if only one first AP is discovered in operation 503.

If there is only one other connectable first AP, one other connectable first AP is shown in the network list, and if there is no other connectable first AP, the controller 110 may inform the user of the absence of other connectable first APs.

Figure 6A:
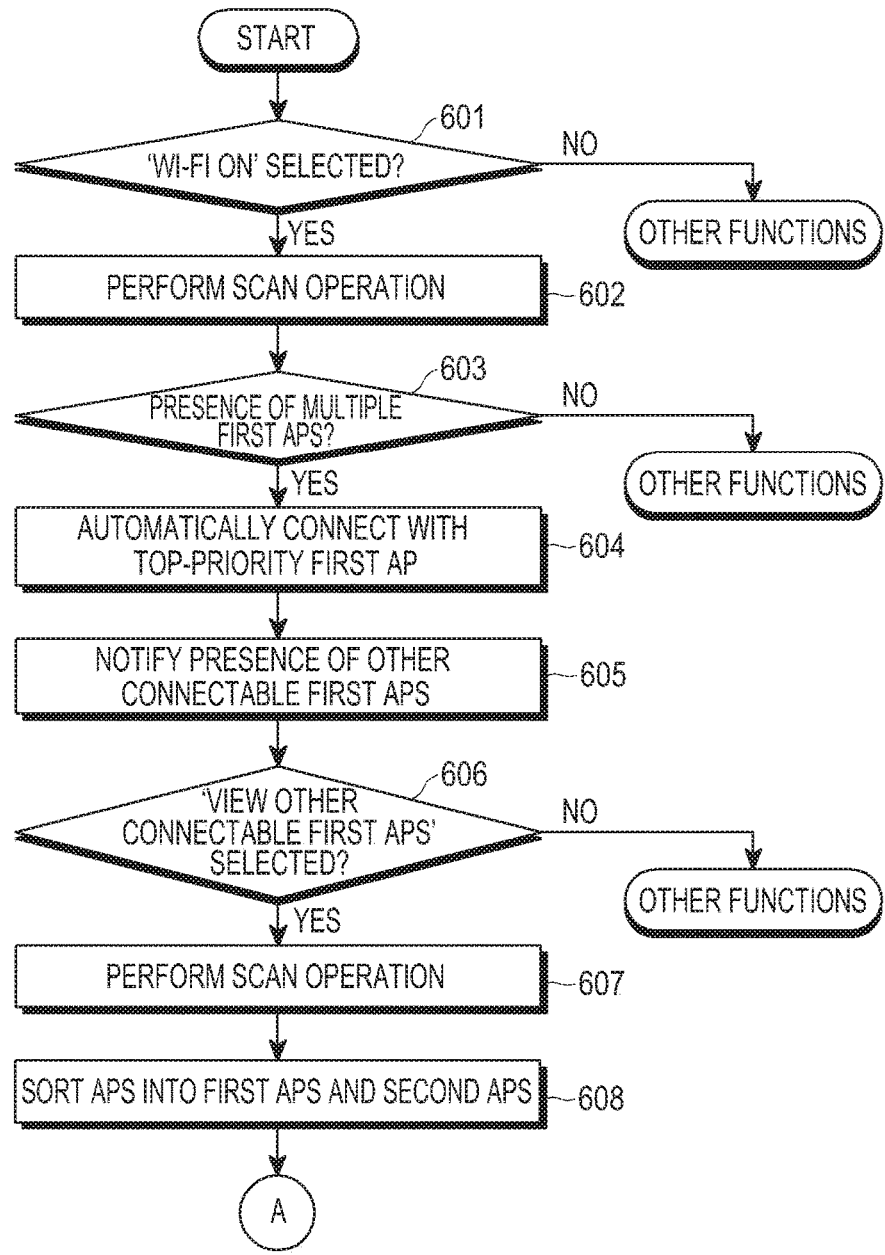
FIGS. 6A and 6B illustrate a process of connecting short-range wireless communication in a terminal according to a third exemplary embodiment of the present invention.
Figure 6B:
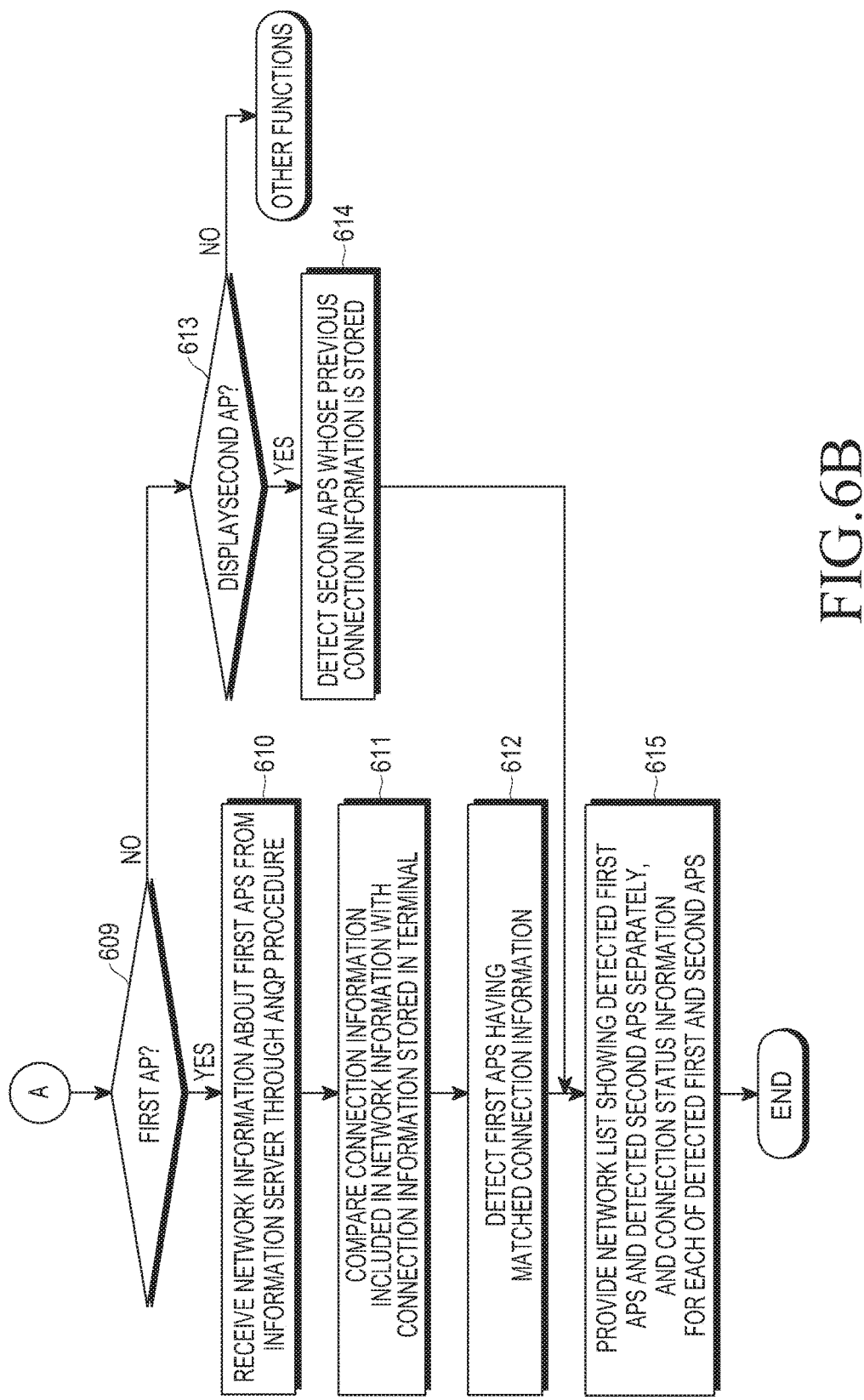

FIGS. 6A and 6B illustrate a process of connecting short-range wireless communication in a terminal according to a third exemplary embodiment of the present invention.

The third exemplary embodiment of the present invention will be described in detail with reference to FIGS. 3, 6A and 6B.

Referring to FIGS. 6A and 6B, if a 'Wi-Fi On' option is selected on the terminal in operation 601, the controller 110 performs a scan operation to discover nearby APs in operation 602.

If a plurality of APs are discovered by the scan operation, the controller 110 may determine whether each of the APs is a first AP which is a Hotspot 2.0-supported AP, or a second AP which is a Hotspot 2.0-unsupported AP, based on the information included in a beacon or probe response received from each of the plurality of discovered APs.

The beacon or probe response includes information about a service provider providing the APs, and BSS link information (for example, network load, channel utilization, a number of connected terminals, and the like).

In the case of a first AP among the plurality of APs, the controller 110 may perform an ANQP procedure of sending a query message to an information server connected to the first AP, and receiving network information for the first AP from the information server in response to the query message.

The network information received through the ANQP procedure may include information (for example, operator information, a connection scheme, a credential type used for connection, an authentication scheme, and the like) that the terminal uses to connect with the first AP, and data speed information of the network.

If there is a plurality of first APs among the plurality of discovered APs in operation 603, the controller 110 automatically connects with a specific first AP (for example, a top-priority first AP) meeting predetermined conditions among the plurality of first APs, in operation 604.

In operation 605, the controller 110 informs the user of the presence of other connectable first APs except for the specific first AP to which the terminal is connected in operation 604, among the plurality of first APs which are discovered by the scan operation in operation 602. Informing the user of the presence of other connectable first APs may be automatically displayed, or may be displayed if a specific menu option (for example, 'Display Wi-Fi Connection Status Information') is selected by the user.

If a 'View Other Connectable First APs' option is selected by the user in operation 606, the controller 110 performs a scan operation again in operation 607. The scan operation in operation 607 is performed taking into account the movement of the terminal and/or the change in the network environment.

The scan operation in operation 607 is performed in the same way as the scan operation in operation 602. In operation 608, the controller 110 sorts a plurality of APs, which are discovered by the scan operation in operation 607, into first APs and second APs.

Although it is assumed in the third exemplary embodiment of the present invention that the controller 110 performs the scan operation again in operation 607 if the 'View Other Connectable First APs' option is selected by the user, the controller 110 may optionally perform operation 608 where it can sort the plurality of APs which have been discovered in operation 602 by the initial scan operation into the first APs and the second APs, without the re-scan operation of operation 607, if the 'View Other Connectable First APs' option is selected by the user.

If the type of the sorted AP is a first AP in operation 609, the controller 110 performs in operation 610 an ANQP procedure of sending a query message to the information server connected to each of the plurality of first APs, and receiving network information for each of the first APs from the information server connected to each of the plurality of first APs in response to the query message.

The controller 110 may optionally omit the ANQP procedure of operation 610, for the first AP having the network information which was received at and stored in the terminal through the previous ANQP procedure, among the plurality of first APs which are sorted in operation 608.

In operation 611, the controller 110 compares connection information included in the network information received through the ANQP procedure with the connection information stored in advance in the memory 130. The connection information may include at least one of a connection method and an authentication scheme.

In operation 612, the controller 110 detects network information having connection information matching with the connection information stored in the memory 130, through the comparison process, and detects the first APs corresponding to the detected network information as other connectable first APs.

If the type of the sorted AP is a second AP in operation 613, the controller 110 detects in operation 614 as other connectable second APs the second APs whose connection information is stored as their previous connection history, among the plurality of second APs.

In operation 615, the controller 110 provides a network list that shows information about the detected first APs and the detected second APs separately, and shows connection status information for each of the detected first and second APs.

If the user selects his/her desired first AP or second AP using the network list provided in operation 615, the controller 110 may perform connection to the selected first AP based on the already stored network information, and perform connection to the selected second AP based on the already stored connection information.

The connection status information shown in the network list may be displayed in at least one of an RSSI, a data rate, a billing status (for example, a pay network or a free network), and a network provider type (for example, a home provider or a roaming partner). The information about other connectable first APs, which is shown in the network list, may be displayed in the order of priority depending on the connection status information. For example, if the connection status information is shown in an RSSI, the information about other connectable first APs may be displayed in the order of a high-RSSI AP.

Although it is assumed in the third exemplary embodiment of the present invention that a plurality of first APs are discovered, the controller 110 may perform connection to one first AP regardless of the predetermined conditions (for example, priority), if only one first AP is discovered in operation 603.

If there is only one other connectable first AP, one other connectable first AP is shown in the network list, and if there is no other connectable first AP, the controller 110 may inform the user of the absence of other connectable first APs.

Figure 7A:
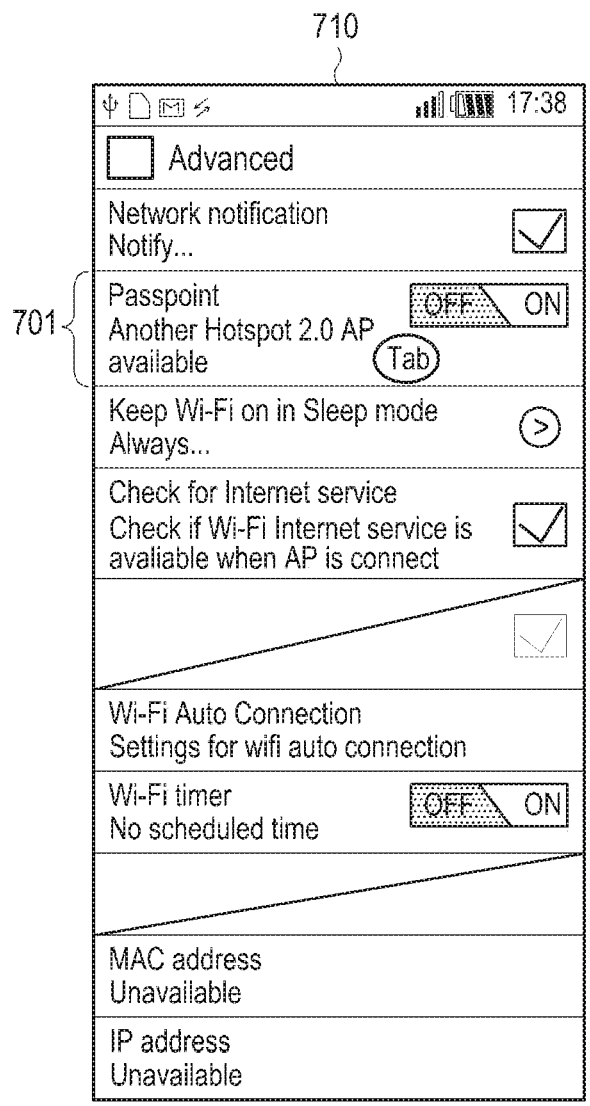
FIGS. 7A to 7C illustrate examples of providing a network list according to an exemplary embodiment of the present invention.
Figure 7B:
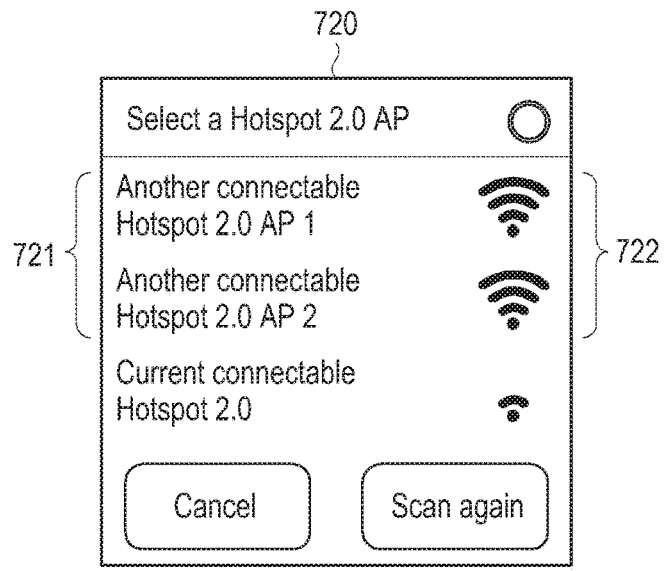
Figure 7C:
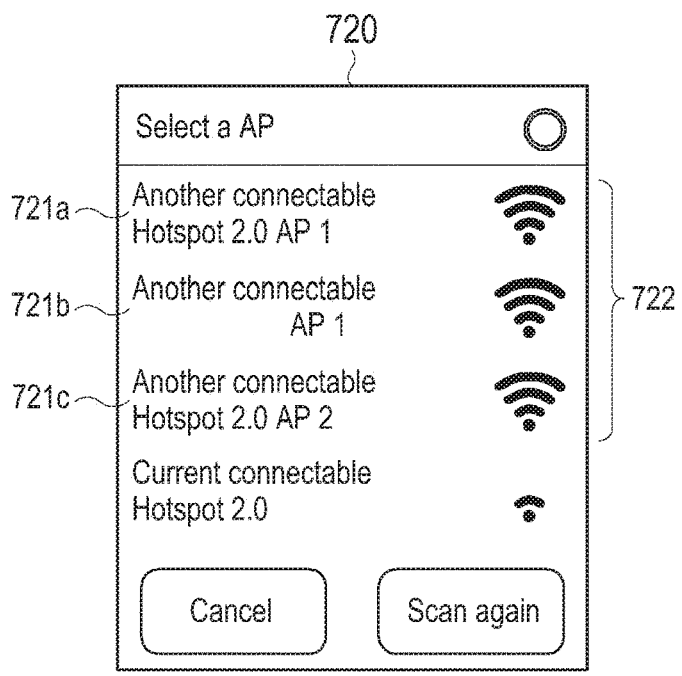

FIGS. 7A to 7C illustrate examples of providing a network list according to an exemplary embodiment of the present invention.

In the example of FIG. 7A, if a 'View Wi-Fi Connection Status Information' option selected by the user after the terminal is connected to a high-priority first AP upon request for Wi-Fi connection, the terminal may display an information screen 710 showing connection status information of the currently connected Wi-Fi. Referring to FIG. 7A, in a specific area 701 of the information screen 710, the terminal shows the presence of other connectable first APs while it is connected to the high-priority first AP. In accordance with the first exemplary embodiment of the present invention, if an icon "Tab" placed in the specific area 701 is selected by the user, the terminal may detect other connectable first APs, and then provide a network list 720 that shows information 721 about the other connectable first APs and connection status information (for example, RSSI) 722 for each of the other connectable first APs, as illustrated in FIG. 7B.

In accordance with the second exemplary embodiment of the present invention, if a connection status value of the first AP to which the terminal is connected is less than or equal to a threshold, while the terminal is connected to the high-priority first AP upon request for Wi-Fi connection, then the terminal may display the network list as illustrated in FIG. 7B.

In accordance with the third exemplary embodiment of the present invention, if the icon "Tab" placed in the specific area 701 of the information screen 710 is selected by the user as in FIG. 7A, the terminal may detect other connectable first and second APs, and then provide the network list 720 that shows information 721*a* and 721*c* about other connectable first APs and information 721*b* about other connectable second APs separately, and shows connection status information (for example, RSSI) 722 for each of the other connectable first and second APs, as illustrated in FIG. 7C.

The network information received through the ANQP procedure may include information about a variety of services provided by the service provider. Therefore, when providing the network list 720 illustrated in FIG. 7B or 7C, the terminal may also display information about the services provided by the service provider of the first AP. For example, if "Another connectable Hotspot 2.0 AP 2" in the network list 720 illustrated in FIG. 7B or 7C indicates a first AP that is installed at a point of "Coffee Shop A", not only connection status information 722 (for example, an RSSI), but also service information (for example, a Uniform Resource Locator (URL) address at which the terminal can access "Coffee Shop A", an icon indicating a downloadable coupon, and a phone number, which can be saved or to which a call can be sent) may be displayed in the area where "Another connectable Hotspot 2.0 AP 2" is shown in the network list 720.

Figure 8:
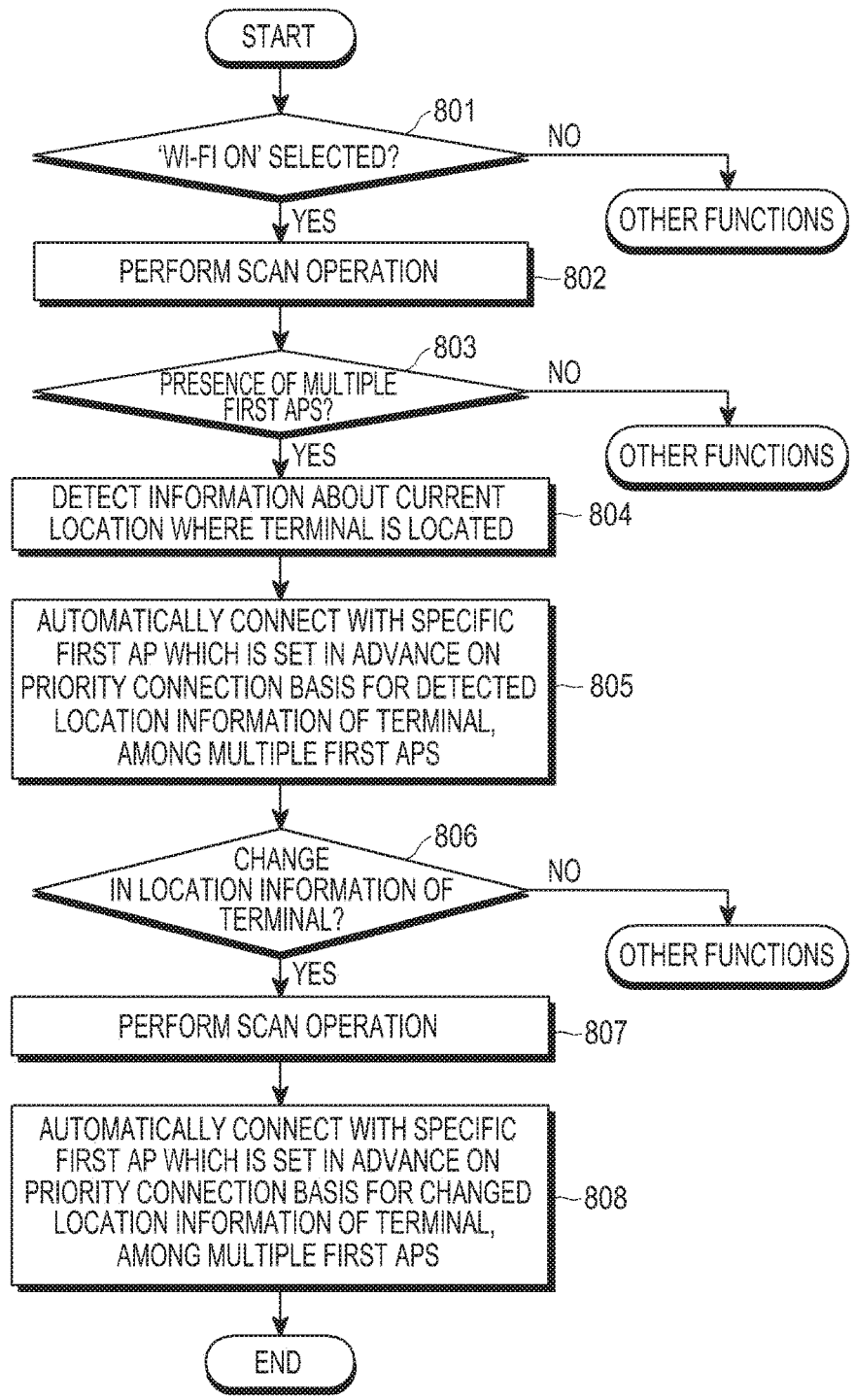
FIG. 8 illustrates a process of connecting short-range wireless communication in a terminal according to a fourth exemplary embodiment of the present invention.

FIG. 8 illustrates a process of connecting short-range wireless communication in a terminal according to a fourth exemplary embodiment of the present invention.

The fourth exemplary embodiment of the present invention will be described in detail with reference to FIGS. 3 and 8.

Referring to FIG. 8, if a 'Wi-Fi On' option is selected on the terminal in operation 801, the controller 110 performs a scan operation to discover nearby APs in operation 802.

If a plurality of APs are discovered by the scan operation, the controller 110 may determine whether each of the APs is a first AP which is a Hotspot 2.0-supported AP, or a second AP which is a Hotspot 2.0-unsupported AP, based on information included in a beacon or probe response received from each of the plurality of discovered APs.

The beacon or probe response includes information about a service provider providing the APs, and BSS link information (for example, network load, channel utilization, a number of connected terminals, and the like).

In the case of a first AP among the plurality of APs, the controller 110 may perform an ANQP procedure of sending a query message to an information server connected to the first AP, and receiving network information for the first AP from the information server in response to the query message.

The network information received through the ANQP procedure may include the information (for example, operator information, a connection scheme, a credential type used for connection, an authentication scheme, and the like) that the terminal uses to connect with the first AP, and the data speed information of the network.

If there is a plurality of first APs among the plurality of discovered APs in operation 803, the controller 110 detects information about the current location where the terminal is located, using the GPS receiver 180, in operation 804.

After detecting the location information of the terminal, the controller 110 detects information about a specific first AP which is set on a priority connection basis in the current location of the terminal, among the APs which are set depending on the location information of the terminal, and information about which is stored in the memory 130. If there is information about a specific first AP which is set on a priority connection basis, among the plurality of discovered first APs, the controller 110 automatically performs connection to the specific first AP based on the network information of the specific first AP in operation 805.

If there is no information about the specific first AP which is set on a priority connection basis, among the plurality of discovered first APs, the controller 110 automatically performs connection to a first AP meeting the predetermined condition (for example, the priority, or the network quality in the connected state), among the plurality of discovered first APs.

Thereafter, if there is a change in the location information of the terminal in operation 806, the controller 110 performs a scan operation in operation 807.

The scan operation in operation 807 is the same as the scan operation in operation 802. Therefore, if a plurality of first APs are discovered by the scan operation in operation 807, the controller 110 detects information about a specific first AP which is set on a priority connection basis depending on the changed location information of the terminal, among the APs which are set depending on the location information of the terminal, and information about which are stored in the memory 130. If there is information about the specific first AP which is set on a priority connection basis, among the plurality of discovered first APs, the controller 110 automatically performs connection to the specific first AP based on the network information of the specific first AP, in operation 808.

Referring to FIG. 8, in order to set a specific first AP on a priority connection basis depending on the location information of the terminal, if communication is performed for a predetermined time or more after the terminal is connected to a specific first AP by Wi-Fi communication, the controller 110 may store the specific first AP in the memory 130 as a first AP which is set on a priority connection basis for the current location information of the terminal.

At least one specific first AP, which can be set on a priority connection basis for each location by the user, may be selected and stored.

The short-range wireless communication connection method proposed by the present invention may be implemented as computer-readable codes in non-transient computer-readable recording media. The non-transient computer-readable recording media may include all kinds of recording devices storing computer-readable data. Examples of the recording media may include Read Only Memory (ROM), Random Access Memory (RAM), optical disks, magnetic tapes, floppy disks, hard disks, non-volatile memories and the like. The non-transient computer-readable recording media may be distributed over the networked computer systems, so the computer-readable codes may be stored and executed in a distributed manner.

As is apparent from the foregoing description, in the short-range wireless communication connection method and apparatus provided by the present invention, if a terminal is connected to a specific external device meeting predetermined conditions, the user may select and access his/her desired external device among other external devices connectable in the current location. The user may easily switch to the desired network as he/she receives information about other external devices connectable in the current location, making it possible to maximize the usability.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus comprising:
a communication circuitry; and
a processor adapted to:
discover, via the communication circuitry, one or more electronic devices using a scan while maintaining a first communication connection with a first electronic device external to the apparatus;

obtain, via the communication circuitry, information related to the one or more electronic devices using an access network query protocol (ANQP);

select a second electronic device from the one or more electronic devices based at least in part on the information related to the one or more electronic device; and establish, via the communication circuitry, a second communication connection with the second electronic device in replacement of the first communication connection.

2. The apparatus of claim 1,
further comprising memory,
wherein the processor is further adapted to:
select, based at least in part on matching a portion of the information with data stored in the memory, an electronic device corresponding to the portion among the one or more electronic devices, as the second electronic device.

3. The apparatus of claim 1, wherein the processor is further adapted to:
select a previously connected device among the one or more electronic devices, as the second electronic device.

4. The apparatus of claim 1, wherein the processor is further adapted to:
request the information related to the one or more electronic devices using the ANQP prior to the obtaining.

5. The apparatus of claim 1, wherein the processor is further adapted to:
perform the selecting based at least in part on a determination that status information with respect to the first communication connection satisfies a specified condition.

6. The apparatus of claim 5, wherein the status information comprises a received signal strength indication (RSSI), a data rate, a billing status, a network provider type, or a combination thereof.

7. The apparatus of claim 1,
further comprising a display,
wherein the processor is further adapted to:
present, via the display, an indication of status information corresponding to the second communication connection.

8. The apparatus of claim 1, wherein the information is provided from the server to the one or more electronic devices using the ANQP, prior to the obtaining.

9. The apparatus of claim 1, wherein the processor is further adapted to:
release the first communication connection, in relation with the establishing of the second communication connection.

10. The apparatus of claim 1, wherein the communication circuitry comprises a Wi-Fi communication circuitry.

11. The apparatus of claim 1, wherein the one or more electronic devices comprise an access point (AP) supporting Hotspot 2.0.

12. An apparatus comprising:
a short-range wireless communication circuitry; and
a processor adapted to:
- establish, via the short-range wireless communication circuitry, a first communication connection with a first electronic device external to the apparatus;
- determine that status information related to the first communication connection with the first electronic device satisfies a specified condition;
- discover, via the short-range wireless communication circuitry, one or more electronic devices by using a scan while maintaining the first communication connection, based at least in part on the determining that the status information satisfies the specified condition;
- transmit a request signal, with respect to network information related to the one or more electronic devices, to the one or more electronic devices, the network information being stored in a server operatively connected to the one or more electronic devices, wherein the one or more electronic devices can request the network information from the server using the request signal;
- receive the network information from the one or more electronic devices, in response to the request signal, the network information being provided from the server to the one or more electronic devices;
- select a second electronic device from the one or more electronic devices based at least in part on the network information; and
- establish, via the short-range wireless communication circuitry, a second communication connection with the second electronic device in replacement of the first communication connection.

13. The apparatus of claim 12, wherein the processor is further adapted to:
perform the transmitting or the receiving, based at least in part on an 802.11u standard.

14. The apparatus of claim 12,
further comprising memory,
wherein the processor is further adapted to:
select, based at least in part on matching a portion of the network information with data stored in the memory, an electronic device corresponding to the portion among the one or more electronic devices, as the second electronic device.

15. The apparatus of claim 12, wherein the processor is further adapted to:
perform the selecting further based at least in part on location information of the apparatus.

16. The apparatus of claim 12,
further comprising a display,
wherein the processor is further adapted to:
present, via the display, a user interface including a first indication of the one or more electronic devices and a second indication of connection status information corresponding to the second electronic device.

17. An apparatus comprising:
a short-range wireless communication circuitry; and
a processor adapted to:
- discover, via the short-range wireless communication circuitry, one or more electronic devices including a second electronic device external to the apparatus by using a scan while maintaining a first communication connection with a first electronic device external to the apparatus via the short-range wireless communication circuitry, the first electronic device corresponding to a first service set identifier (SSID), the second electronic device corresponding to a second SSID different from the first SSID;
- obtain, via the short-range wireless communication circuitry, information related to the second electronic device from one or more electronic devices, the information provided from a server operatively connected to the second electronic device;
- select the second electronic device from the one or more electronic devices based at least in part on the information related to the second electronic device; and
- establish, via the short-range wireless communication circuitry, a second communication connection with the second electronic device in replacement of the first communication connection.

18. The apparatus of claim 17, wherein the processor is further adapted to:
communicate, as part of the obtaining, with the one or more electronic devices using an access network query protocol (ANQP).

19. The apparatus of claim 17, wherein the first electronic device is operated by a home provider and the second electronic device is operated by a roaming partner.

20. The apparatus of claim 17, wherein the processor is further adapted to:
perform the selecting based at least in part on a determination that status information with respect to the first communication connection satisfies a specified condition.

* * * * *